Patented Dec. 30, 1930

1,787,233

UNITED STATES PATENT OFFICE

CHALFANT E. BIVINS, OF BROOKLYN, NEW YORK

INK

No Drawing.   Application filed April 6, 1925.   Serial No. 21,214.

The invention relates to inks, and more particularly to a composition which may remain in powder or paste form until it is desired to place same in solution with water for writing purposes.

An ink embodying my invention meets those requirements set in the specification for inks issued by the U. S. Government for the production of permanent or non-fugitive and colored inks, and when in solution, there will be no such precipitation as will cause any substantial variation in the strength or depth of color in writing made therewith, or interfere with the free flowing of the ink when writing therewith.

Furthermore, an ink embodying my invention may be produced in many desired colors by a mere selection of the coloring pigment, and irrespective of the color of the ink in use, there will be no tendency of the ink to thicken on or about a pen in a manner to interfere with the free flowing of the ink, thus particularly adapting the invention to the production of inks of different colors for use in fountain pens.

Before the ink is placed in solution, whether it be in dry powder, or in paste form, it will not be deleteriously affected by climatic or temperature changes, since even when in paste form it will not freeze, when subjected to a temperature of 50 or more degrees F. below the freezing point of water. Any available water may be used for placing the composition in solution, ordinary drinking waters being adapted for this use irrespective of whether they be "hard", as found largely in the eastern part of the United States, or alkaline, as found in the western part. Its property of not freezing even under extremely low temperatures, permits it to be stored in large quantities without requiring special attention to avoid loss from the breakage of the containers from freezing of the ink, but even though the composition in paste form should freeze, nevertheless the substances entering into the ink will not be injured in any way and no loss will result since by merely thawing out the composition, it will have, when placed in solution, all of the desired properties. Of course, when the ink is in powder form it cannot freeze.

When producing the ink in paste form the substances used for moistening the dry constituents of the ink are of a nature which will cause them, of themselves, to go readily into solution with water, and avoid the presence of any substantial sediment in the ink.

The invention consists primarily in an ink containing therein in dry powdered form an admixture of suitable coloring matter, a crystalline organic substance selected from the group consisting of citric acid, benzoic acid, a combination of these acids, salicylic acid, tartaric acid and succinic acid for avoiding undue precipitation of sediment, and crystalline benzoic acid; and in such other novel characteristics as are hereinafter set forth and described and more particularly pointed out in the claims hereto appended.

The ink of my invention may be so compounded that when placed in solution, it may be used for either copying or noncopying record inks, or for producing colored inks which are not record inks. The general character of the ink is determined by known ingredients used in known proportions, and while I will recite below certain specific formulæ, such are given merely to show the adaptability of the invention for the production of inks which will measure up to certain fixed standards in respects determined by characteristics other than those imparted by my invention.

The organic acids used are preferably citric acid, benzoic acid, or a combination of these acids, although salicylic or tartaric acid, or succinic acid, or acid salts, which in hydrolyzing form acids, may be used.

By way of example, one formula I have used for producing a black record and copying ink is as follows:—

| | Gms. |
|---|---|
| Tannic acid U. S. P | 23.4 |
| Gallic acid U. S. P | 7.7 |
| Ferrous sulphate U. S. P | 30.0 |
| Citric acid U. S. P | 8 to 10 |
| Benzoic acid U. S. P | 1.0 |
| Coloring matter | 3.5 |

The coloring matter used in this formula may be that commonly used for producing ordinary blue black or socalled black inks.

For producing what is known as a noncopying writing fluid, I have used the following report:—

| | Gms. |
|---|---|
| Tannic acid U. S. P | 11.7 |
| Gallic acid U. S. P | 3.4 |
| Ferrous sulphate U. S. P | 15.0 |
| Citric acid U. S. P | 4 to 5 |
| Benzoic acid U. S. P | 1.0 |
| Color | 3.5 |

I have found that the more desirable results are secured with the lower proportions of citric acid, although within the range given, and possibly even with greater proportions, satisfactory results can be secured. Under some conditions, I have used as high as 44 gms. citric acid for the copying record ink, and 22 gms. for the production of ink which is non-copying, the so called commercial writing fluid.

Tannic acid, gallic acid and ferrous sulphate are commonly used in inks to give permanency to writings made therewith.

As an example of colored inks embodying my invention, the formula given below produces a non-fluid ink, which when placed in solution, will not dry out or solidify, thus adapting it particularly for use in fountain pens, and at the same time avoid that wastage resulting from the drying out of such ingredients when in ink wells. The formula is as follows:—

| | Gms. |
|---|---|
| Crocein scarlet 3B | 5.5 |
| Citric acid | .4 to 4 |
| Benzoic acid | .1 to 1 |

Any other suitable coloring matter may be substituted for the crocein scarlet.

The addition of the organic acids ensures a fluidity of the ink which will permit it to run freely when the composition is placed in solution with water, and will avoid the drying out of the ink and the formation of that residue commonly found in colored inks particularly when such inks are used in fountain pens.

The use of the crystalline organic salts above referred to, permits all of the ingredients to be reduced to the desired fineness by grinding, and ensures their being readily dissolved in water.

If it be desired to place the ingredients or constituents above referred to in paste form, this may be done by mixing them with sufficient water and alcohol, or water, alcohol and glycerin to form a stiff paste which may be readily stored in collapsible tubes, and which will not be affected by extremely low temperatures. If 50% of the fluid used for forming the paste be alcohol, a temperature of 20° F. below zero will not cause the solidification of the paste. The presence of glycerin is merely for the purpose of checking evaporation.

The use of citric acid will not only prevent undue precipitation of sediment, but will permit hard water to be used for placing the compound in solution. Benzoic acid acts mainly as a preservative.

I believe it to be broadly new to provide an ink either in powder or paste form, one of the constituents of which is a crystalline organic acid, or acid salt which upon hydrolyzing, forms an acid, which ink may be readily placed in solution with ordinary drinking water, and I intend to claim such broadly.

Having described the invention what I claim as new and desire to have protected by Letters Patent, is:—

1. An ink containing therein in dry powdered form an admixture of suitable coloring matter, a crystalline organic substance selected from the group consisting of citric acid, benzoic acid, a combination of these acids, salicylic acid, tartaric acid and succinic acid, for avoiding undue precipitation of sediment, and crystalline benzoic acid.

2. An ink containing therein in dry powdered form an admixture of suitable coloring matter, ingredients for giving permanency to writings made with the ink, a crystalline organic substance selected from the group consisting of citric acid, benzoic acid, a combination of these acids, salicyclic acid, tartaric acid and succinic acid, for avoiding undue precipitation of sediment, and crystalline benzoic acid.

3. An ink containing therein in dry powdered form an admixture of suitable coloring matter, crystalline citric acid and crystalline benzoic acid in substantially the range of proportions herein described.

4. An ink containing therein in dry powdered form an admixture of suitable coloring matter, ingredients for giving permanency to writings made with the ink, crystalline citric acid and crystalline benzoic acid in substantially the range of proportions herein described.

5. An ink containing therein in undissolved form an admixture of suitable coloring matter, a crystalline organic substance selected from the group consisting of citric acid, benzoic acid, a combination of these acids, salicylic acid, tartaric acid and succinic acid, for avoiding undue precipitation of sediment, and crystalline benzoic acid.

6. An ink containing therein in undissolved form an admixture of suitable coloring matter, a crystalline organic substance selected from the group consisting of citric acid, benzoic acid, a combination of these acids, salicylic acid, tartaric acid and succinic acid, water, alcohol and glycerin sufficient to reduce the other constituents to the form of paste for avoiding undue precipitation of sediment, and crystalline benzoic acid.

7. An ink containing therein in undissolved form an admixture of suitable coloring matter, crystalline citric acid, crystalline benzoic acid in substantially the proportions herein described, water and alcohol sufficient to reduce the other constituents to the form of paste.

8. An ink containing therein in undissolved form an admixture of suitable coloring matter, ingredients for giving permanency to writings made with the ink, crystalline citric acid, crystalline benzoic acid in substantially the range of proportions herein described, water and alcohol sufficient to reduce the other constituents to the form of paste.

9. An ink containing therein in undissolved form an admixture of suitable coloring matter, crystalline citric acid, crystalline benzoic acid in substantially the range of proportions herein described, water, alcohol and glycerin sufficient to reduce the other constituents to the form of paste.

10. An ink containing therein in undissolved form an admixture of suitable coloring matter, ingredients for giving permanency to writings made with the ink, crystalline citric acid, crystalline benzoic acid in substantially the proportions herein described, water, alcohol and glycerin sufficient to reduce the other constituents to the form of paste.

11. An ink containing therein in undissolved form an admixture of suitable coloring matter, a crystalline organic substance selected from the group consisting of citric acid, benzoic acid, a combination of these acids, salicylic acid, tartaric acid and succinic acid, for avoiding undue precipitation of sediment, and crystalline benzoic acid.

In witness whereof I have hereunto affixed my signature, this 20th day of March, 1925.

CHALFANT E. BIVINS.